(12) United States Patent
Pan

(10) Patent No.: US 10,315,654 B2
(45) Date of Patent: Jun. 11, 2019

(54) VEHICLE CONTROL DEVICE

(71) Applicant: DENSO CORPORATION, Kariya, Aichi-pref. (JP)

(72) Inventor: Liangchen Pan, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/551,564

(22) PCT Filed: Feb. 9, 2016

(86) PCT No.: PCT/JP2016/000661
§ 371 (c)(1),
(2) Date: Aug. 16, 2017

(87) PCT Pub. No.: WO2016/132709
PCT Pub. Date: Aug. 25, 2016

(65) Prior Publication Data
US 2018/0029595 A1 Feb. 1, 2018

(30) Foreign Application Priority Data
Feb. 20, 2015 (JP) .................................. 2015-031742

(51) Int. Cl.
*G06F 19/00* (2018.01)
*B60W 30/16* (2012.01)
(Continued)

(52) U.S. Cl.
CPC ........ *B60W 30/16* (2013.01); *B60W 30/1882* (2013.01); *B60W 30/18163* (2013.01);
(Continued)

(58) Field of Classification Search
CPC ....... B60W 30/16; B62D 15/025; B62D 1/28; B60N 2/143; B60K 6/44; B60K 41/18;
(Continued)

(56) References Cited

U.S. PATENT DOCUMENTS 4,542,460 A * 9/1985 Weber ................. B60R 16/0236
701/1
5,485,378 A * 1/1996 Franke ................. B62D 15/025
348/118
(Continued)

FOREIGN PATENT DOCUMENTS

JP H04-300781 A 10/1992
JP H07-172337 A 7/1995
(Continued)

*Primary Examiner* — Yuri Kan
(74) *Attorney, Agent, or Firm* — Knobbe, Martens, Olson & Bear, LLP

(57) ABSTRACT

Provided is a vehicle control device including an operation amount obtaining unit, a first setting unit, a second setting unit, and a third setting unit. The operation amount obtaining unit obtains a driver's driving operation amount. The first setting unit sets a first target value for vehicle travel control based on the driving operation amount obtained by the operation amount obtaining unit. The second setting unit sets a second target value for controlling the vehicle travel by automated control. The third setting unit sets a third target value for actually controlling the vehicle travel by synthesizing the first target value and the second target value based on the driving operation amount or the first target value.

15 Claims, 9 Drawing Sheets

(51) Int. Cl.
*B60W 50/08* (2012.01)
*B60W 50/10* (2012.01)
*B60W 30/18* (2012.01)
*B60W 30/188* (2012.01)
B60W 50/00 (2006.01)

(52) U.S. Cl.
CPC .......... *B60W 50/082* (2013.01); *B60W 50/10* (2013.01); *B60W 2050/0073* (2013.01); *B60W 2420/42* (2013.01); *B60W 2420/52* (2013.01); *B60W 2510/0657* (2013.01); *B60W 2510/18* (2013.01); *B60W 2510/20* (2013.01); *B60W 2520/10* (2013.01); *B60W 2520/105* (2013.01); *B60W 2540/10* (2013.01); *B60W 2540/103* (2013.01); *B60W 2540/106* (2013.01); *B60W 2540/12* (2013.01); *B60W 2540/18* (2013.01); *B60W 2540/20* (2013.01); *B60W 2550/14* (2013.01); *B60W 2550/141* (2013.01); *B60W 2550/302* (2013.01); *B60W 2550/308* (2013.01); *B60W 2550/402* (2013.01); *B60W 2720/10* (2013.01); *B60W 2750/302* (2013.01); *B60W 2750/308* (2013.01); *Y02T 10/56* (2013.01); *Y02T 10/84* (2013.01)

(58) Field of Classification Search
CPC .. B60R 16/0236; F02D 41/1406; G06F 19/00
See application file for complete search history.

(56) References Cited

U.S. PATENT DOCUMENTS

| | | | |
|---|---|---|---|
| 6,263,270 B1 * | 7/2001 | Sato | B62D 1/28 |
| | | | 180/167 |
| 6,484,832 B1 * | 11/2002 | Morisawa | B60K 6/44 |
| | | | 180/65.225 |
| 7,512,477 B2 * | 3/2009 | Quigley | F02D 41/1406 |
| | | | 701/103 |
| 2006/0207822 A1 * | 9/2006 | Taylor | B60N 2/143 |
| | | | 180/326 |
| 2009/0240398 A1 | 9/2009 | Nanami | |
| 2012/0046817 A1 | 2/2012 | Kindo et al. | |
| 2012/0109461 A1 | 5/2012 | Nitta et al. | |
| 2014/0018993 A1 | 1/2014 | Kindo et al. | |

FOREIGN PATENT DOCUMENTS

| | | |
|---|---|---|
| JP | H10-152063 A | 6/1998 |
| JP | 2010-264829 A | 11/2010 |
| JP | 4661920 B2 | 3/2011 |
| JP | 2012-096568 A | 5/2012 |

* cited by examiner

VEHICLE CONTROL DEVICE

CROSS REFERENCE TO RELATED APPLICATION

This application is based on Japanese Patent Application No. 2015-31742 filed on Feb. 20, 2015, disclosure of which is incorporated herein by reference.

TECHNICAL FIELD

The present disclosure relates to technology for vehicle travel control based on driver's driving operation and automated control.

BACKGROUND ART

As an example of technology to reduce the operational burden on a vehicle driver, a vehicle control device has been known which makes a subject vehicle follow a preceding vehicle through automated control of vehicle speed or the like so as to keep the distance between the preceding vehicle and the subject vehicle constant (see, for example, Patent Literature 1).

An existing vehicle control device can switch over between vehicle travel control based on driver's driving operation such as example, accelerator pedal operation, brake pedal operation or the like and vehicle travel control based on automated control, according to the driver's turning on and off of a travel assistance switch for automated control. Also, when the driver expresses his/her willingness to control vehicle travel by operating an accelerator pedal or the like during automated control, the automated control is discontinued.

PRIOR ART LITERATURE

Patent Literature

Patent Literature 1: JP2010-264829A

SUMMARY OF INVENTION

As described above, in the existing technology, vehicle travel is controlled either by driver's driving operation or by automated control performed by a vehicle control device. Therefore, when there are frequent switchover between a situation where a driver is desirous of controlling vehicle travel by his/her driving operation and a situation where the driver is desirous of leaving vehicle control to automated control, the driver is required to operate a travel assistance switch for every switchover. Such operation is troublesome.

In view of the above situation, it is an object of the present disclosure to provide technology for appropriately controlling vehicle travel based on driver's driving operation and automated control.

A vehicle control device in an aspect of the present disclosure comprises an operation amount obtaining unit, a first setting unit, a second setting unit, and a third setting unit.

The operation amount obtaining unit obtains a driver's driving operation amount. Based on the driving operation amount obtained by the operation amount obtaining unit, the first setting unit sets a first target value for vehicle travel control. By automated control, the second setting unit sets a second target value for controlling the vehicle travel. By synthesizing the first target value and the second target value based on the driving operation amount or the first target value, the third setting unit sets a third target value for actually controlling the vehicle travel.

In the above configuration, the vehicle control device sets the third target value for actually controlling vehicle travel, by synthesizing the first target value, which is set based on the amount of driver's driving operation, and the second target value, which is set by automated control. This makes it unnecessary for the vehicle driver to operate a switch or the like to switch over between vehicle control made by driver's driving operation and automated vehicle control.

Furthermore, an appropriate third target value to be applied to vehicle travel control can be set while using automated travel assistance and reflecting the amount of driver's driving operation.

Since the third target value is set by synthesizing the first target value and the second target value based on a driving operation amount or the first target value that is set based on the driving operation amount, the third target value for actually controlling vehicle travel can be set appropriately reflecting the amount of driver's driving operation.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the present disclosure will be described below based on drawings.

1. First Embodiment

<1-1 Configuration>

Figure 1:
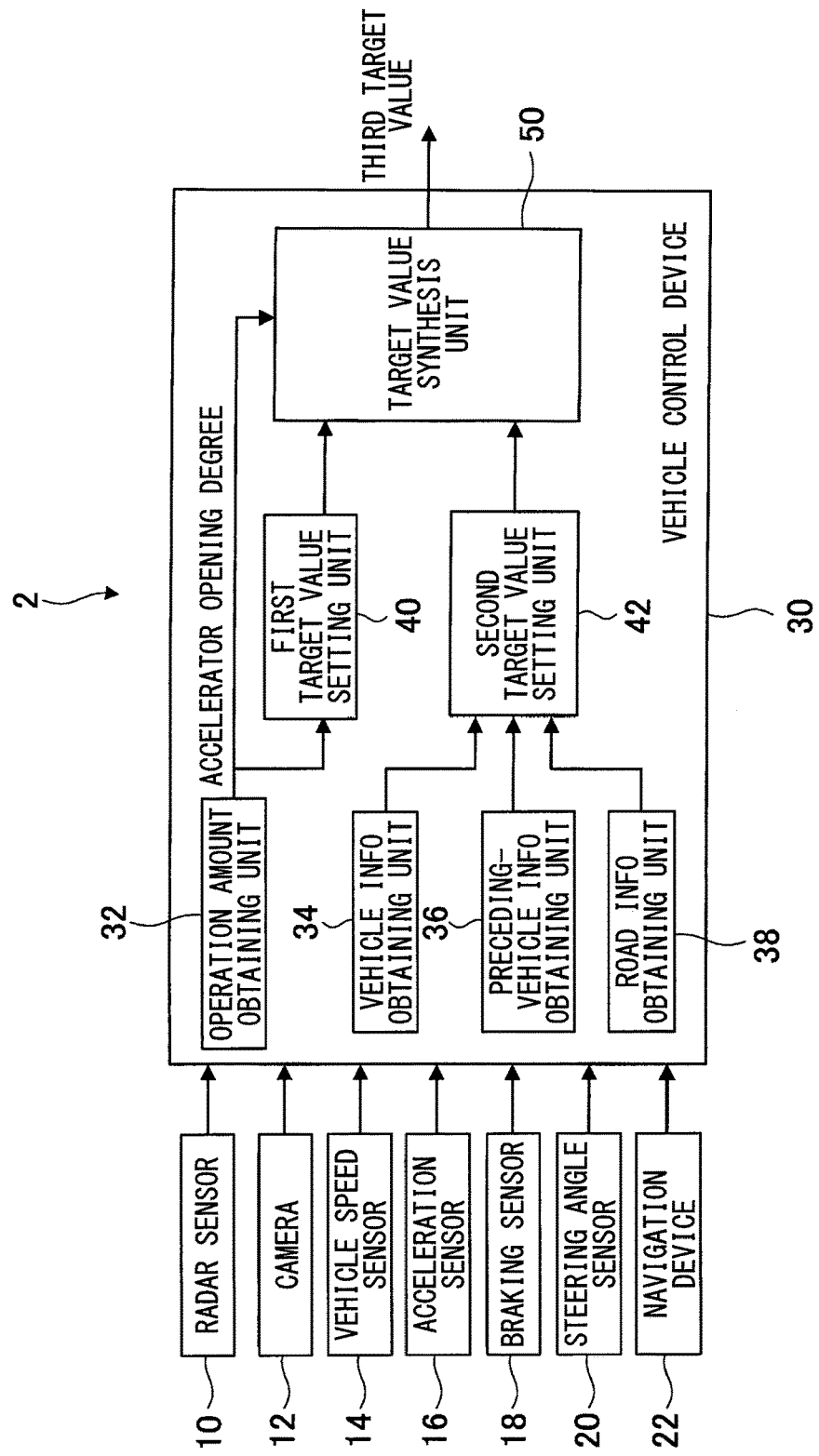
FIG. 1 is a block diagram of a vehicle control system according to a first embodiment.

A vehicle control system 2 shown in FIG. 1 is mounted to a vehicle and controls traveling of the vehicle. The vehicle control system 2 mainly includes various sensors and devices to detect an amount of driver's driving operation, traveling conditions of the subject vehicle, traveling conditions of a preceding vehicle ahead of the subject vehicle, and conditions of the subject vehicle traveling road and the like, and a vehicle control device 30.

The sensors and devices the vehicle control system 2 is equipped with include a radar sensor 10, a camera 12, a vehicle speed sensor 14, an acceleration sensor 16, a braking sensor 18, a steering angle sensor 20, and a navigation device 22.

The radar sensor 10 scans, by emitting laser beams, areas frontward, sideward and rearward of the subject vehicle at predetermined scan angles, detects reflected laser beams, determines the distances from objects that have reflected the laser beams based on the amounts of time taken by the laser beams to reach the objects and return, by being reflected, from the objects, and also determines the directions in which the objects are present based on the directions in which the laser beams before being reflected were emitted. The radar sensor 10 need not necessarily be one using laser beams and may be one making use of radio waves of a millimeter wave band or a microwave band or making use of ultrasonic sound waves.

The camera 12 captures images of areas forward, sideward and rearward of the subject vehicle. The image data captured by the camera 12 is analyzed by an image analysis device, not shown, and, thereby, it is determined whether objects present forward, sideward or rearward of the subject vehicle are vehicles or obstacles.

The vehicle speed sensor 14 detects a current speed of the subject vehicle and the acceleration sensor 16 detects the amount of accelerator pedal depression. The braking sensor 18 detects the amount of brake pedal depression and the steering angle sensor 20 detects the angle of steering of a steering wheel.

The navigation device 22 includes a GPS and map data. The navigation device 22 determines the location of the subject vehicle based on GPS signals received from GPS satellites and maps the location of the subject vehicle on map data, while guiding the subject vehicle along its travel route.

The vehicle control device 30 is provided with a microcomputer including a CPU, a ROM, a RAM, and a flash memory, an A/D conversion circuit, an input/output interface (I/O), and a communication circuit for communication with other ECUs via an in-vehicle LAN.

An operation amount obtaining unit 32, a vehicle information obtaining unit 34, a preceding-vehicle information obtaining unit 36, a road information obtaining unit 38, a first target value setting unit 40, a second target value setting unit 42, and a target value synthesis unit 50 are configured with hardware of the microcomputer or software such as control programs or the like.

The operation amount obtaining unit 32 obtains, as amounts of driver's driving operation, the amount of accelerator pedal depression from the acceleration sensor 16, the amount of brake pedal depression from the braking sensor 18, the steering angle of the steering wheel from the steering angle sensor 20, and the like. The operation amount obtaining unit 32 calculates the speed of the driver's steering operation based on steering angle changes.

Figure 2:
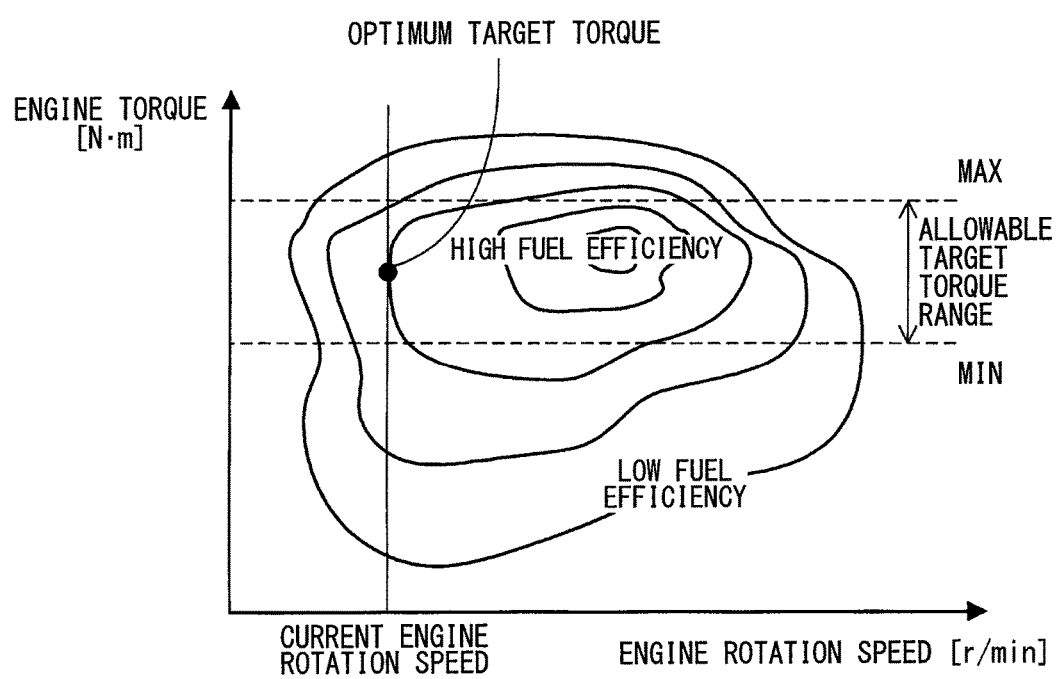
FIG. 2 is a characteristic diagram illustrating relationships between engine rotation speed and fuel efficiency within an allowable torque range.

The vehicle information obtaining unit 34 obtains, as subject-vehicle traveling information, engine rotation speed, subject-vehicle speed, generator rotation speed, and the like. The vehicle information obtaining unit 34 also obtains, based on a map as shown in FIG. 2, an optimum target torque value to achieve maximum fuel efficiency within an engine torque range allowable for the current engine rotation speed.

The preceding-vehicle information obtaining unit 36 detects a preceding vehicle traveling ahead of the subject vehicle using the radar sensor 10, the camera 12 or the like, and obtains, as preceding-vehicle traveling information, the distance between the preceding vehicle and the subject vehicle, the traveling speed of the preceding vehicle, and the like.

The road information obtaining unit 38 obtains, as road information, the gradient and curving degree of a road portion ahead of the subject vehicle and the like from a map database included in the navigation device 22.

The first target value setting unit 40 sets, based on the amount of driver's driving operation obtained by the operation amount obtaining unit 32 and using a map or the like, a target torque value requested by driver's driving operation as a first target value for controlling traveling of the subject vehicle.

In the first embodiment, based on the accelerator opening degree represented by the amount of accelerator pedal depression obtained by the operation amount obtaining unit 32, a first target value for controlling traveling of the subject vehicle is set to the target torque value requested by driver's accelerator pedal operation, by the first target value setting unit 40.

The second target value setting unit 42 sets second target value to an optimum target torque value to achieve maximum fuel efficiency during automated control of vehicle travel. This is done based on the subject-vehicle traveling information obtained by the vehicle information obtaining unit 34, the preceding-vehicle traveling information obtained by the preceding-vehicle information obtaining unit 36, and the road information about a road portion ahead of the subject vehicle obtained by the road information obtaining unit 38 and using a map or the like.

The target value synthesis unit 50 sets, as a third target value, an actual target torque value for controlling traveling of the subject vehicle. This is done by synthesizing the first target value set by the first target value setting unit 40 and the second target value set by the second target value setting unit 42.

Figure 3:
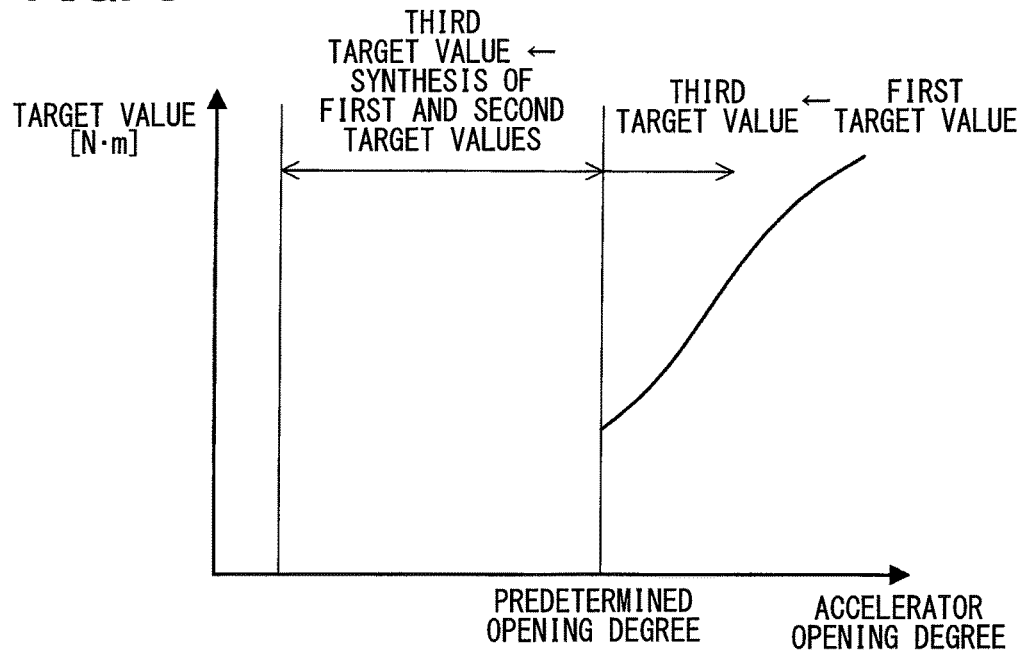
FIG. 3 is a characteristic diagram illustrating synthesis of a first target value and a second target value.

As shown in FIG. 3, when the accelerator opening degree is smaller than a predetermined opening degree set as a threshold, the target value synthesis unit 50 sets a third target value by synthesizing the first target value and the second target value.

When the accelerator opening degree is equal to or larger than the predetermined opening degree, it is determined that the driver is strongly desirous of accelerating the subject vehicle and the target value synthesis unit 50 sets the third target value to the first target value set based on the amount of driver's acceleration operation, without using the second target value set by automated control.

Based on the third target value outputted by the target value synthesis unit 50, an engine control device, not shown, controls the throttle opening of a gasoline engine or the amount of fuel injection or the like by the fuel injection valve of a diesel engine, or the amount of current applied to an electric motor used as a drive source. This controls the output torque of the engine to equal the third target value.

In cases where the switchover using a predetermined opening degree of the accelerator opening degree as a threshold is made between a mode in which the third target value is set by synthesizing the first target value and the second target value and a mode in which the third target value is set to the first target value, the target value synthesis unit 50 sets the third target value such that the third target value does not change when the switching is made at the predetermined accelerator opening degree. For example, the target value synthesis unit 50 synthesizes the first target value and the second target value such that the third target value comes closer to the first target value as the accelerator opening degree becomes larger toward the predetermined accelerator opening degree.

When the accelerator opening degree varies across the predetermined opening degree involving switching of the third target value at the predetermined opening degree, the target value synthesis unit 50 may vary the third target value within a range where the driver remains feeling that the traveling condition of the subject vehicle is unchanged.

Figure 4:
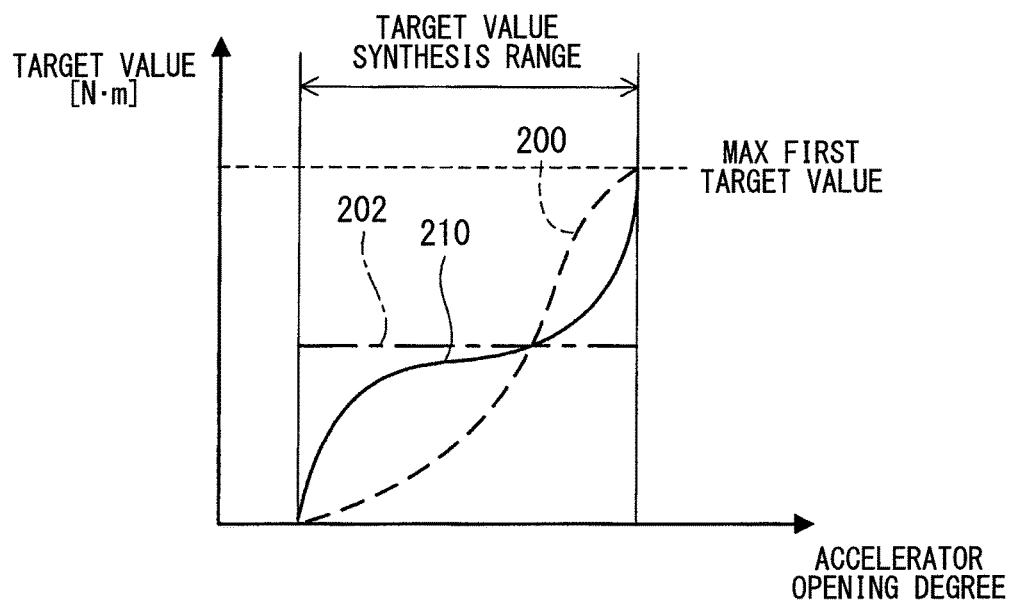
FIG. 4 is a characteristic diagram illustrating relationships between a first target value, a second target value, and a third target value.

As shown in FIG. 4, when the target value synthesis unit 50 sets the third target value 210 by synthesizing the first target value 200 and the second target value 202, the third target value 210 is set to be between the first target value 200 and the second target value 202. When the first target value 200 and the second target value 202 are equal, the third target value 210 I set to either the first target value or the second target value.

In FIG. 4, for simplification, the second target value for automated vehicle travel control is shown to be constant regardless of the accelerator opening degree.

When the accelerator opening degree is in a range where the third target value 210 is set by synthesizing the first target value 200 and the second target value 202, the target value synthesis unit 50 sets the third target value 210 to be between the first target value 200 and the second target value 202 using the following equations (1) and (2).

In the case of the first target value <the second target value, the following equation (1) is used.

Third target value=second target value−(second target value−first target value)*$f1$ {(second target value−first target value)/second target value}    equation (1)

In equation (1), $f1(0)=0$, $f1(1)=1$, and, $f1(x)$ monotonically increases for $0 \leq x \leq 1$.

In the case of the first target value the second target value, the following equation (2) is used.

Third target value=second target value+(first target value−second target value)*$f2$ {(first target value−second target value)/(maximum first target value−second target value)}    equation (2)

In equation (2), $f2(0)=0$, $f2(1)=1$, and $f2(x)$ monotonically increases for $0 \leq x \leq 1$.

In equation (2), the maximum first target value is a maximum value of the first target value within the range of the accelerator opening degree where the third target value 210 is set by synthesizing the first target value 200 and the second target value 202.

<1-2 Advantages>

The first embodiment described above involves the following advantages.

(1) When the accelerator opening degree is smaller than a predetermined opening degree, the target value synthesis unit 50 sets the third target value by synthesizing the first target value and the second target value. When the accelerator opening degree has reached or exceeded the predetermined opening degree, the target value synthesis unit 50 sets the third target value to the first target value without using the second target value.

This makes it unnecessary for the vehicle driver to operate a switch or the like to switch over between vehicle control by driver's accelerator operation and automated vehicle control.

(2) When the accelerator opening degree is smaller than a predetermined opening degree, the target value synthesis unit 50 sets the third target value by synthesizing the first target value and the second target value, so that the third target value for vehicle travel control can be appropriately set while using automated travel assistance and reflecting the amount of driver's accelerator pedal operation.

(3) When the amount of accelerator operation reaches or exceeds a predetermined accelerator opening degree, the target value synthesis unit 50 sets the third target value to the first target value without using the second target value. Therefore, when the driver becomes greatly desirous of controlling the vehicle travel, the vehicle travel can be controlled according to the driver's will.

(4) When the third target value is set using equations (1) and (2) as shown in FIG. 4, the direction of increase/decrease of the first target value, which is set based on the amount of driver's driving operation, agrees with the direction of increase/decrease of the third target value for the vehicle control device 30 to actually perform the vehicle travel control. Therefore, the driver's intention in driving operation represented by the amount of driver's driving operation is reflected in the vehicle travel control by the vehicle control unit 30.

(5) When the third target value is set using equations (1) and (2) as shown in FIG. 4, the direction of increase/decrease of the difference between the second target value and the first target value agrees with the direction of increase/decrease of the difference between the second target value and the third target value. Specifically, the magnitude relationship between the second target value, which is set based on automated control, and the first target value, which is set based on the amount of driver's driving operation, is reflected in the magnitude relationship between the second target value, which is set based on automated control, and the third target value for actually controlling vehicle travel.

Thus, the magnitude relationship between the second target value, which is set based on automated control, and the first target value, which is set based on the amount of driver's driving operation, is appropriately reflected in the third target value.

(6) In cases where switch over is made, at a predetermined accelerator opening degree, between a mode in which the third target value is set by synthesizing the first target value and the second target value and a mode in which the third target value is set to the first target value, the target value synthesis unit 50 sets the third target value such that the third target value does not change when the switching is made at the predetermined accelerator opening degree.

Thus, variation of the third target value across the predetermined accelerator opening degree is continuous. Therefore, even when the accelerator opening degree changes across the predetermined accelerator opening degree, the corresponding variation of vehicle travel control takes place smoothly.

(7) When the first target value and the second target value coincide with each other, a target value for vehicle travel control that is requested by driver's driving operation coincides with a target value for vehicle travel control that is requested by automated control.

Therefore, by setting, when the first target value and the second target value coincide with each other, the third target value to coincide with the first target value or the second target value, the driver's request concerning vehicle travel control and the request by automated control concerning vehicle travel control can be appropriately reflected in vehicle travel control actually performed by the vehicle control device 30.

(8) Since the second target value is set so as to achieve maximum fuel efficiency and the third target value for actually controlling vehicle travel is set by synthesizing the second target value and the first target value, fuel efficiency can be improved while reflecting the amount of driver's driving operation.

2. Second Embodiment

<2-1 Configuration>

Figure 5:
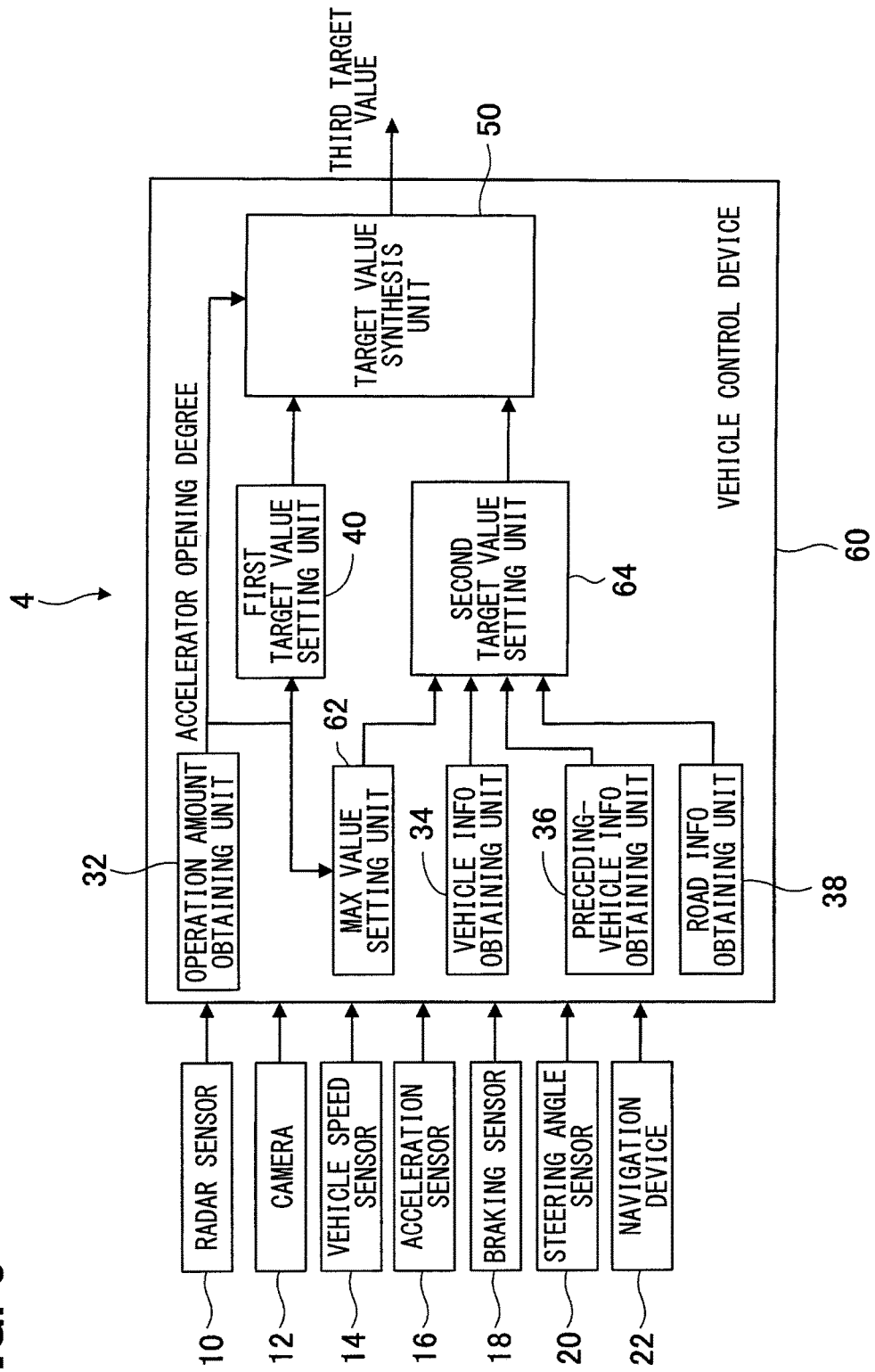
FIG. 5 is a block diagram of a vehicle control system according to a second embodiment.

A vehicle control system 4 of a second embodiment shown in FIG. 5 differs from the vehicle control system 2 of the first embodiment in that a maximum value of the second target value is set. In the other respects, the vehicle control system 4 is configured substantially identically to the vehicle control system 2.

A maximum value setting unit 62 sets, based on the accelerator opening degree set by driver's driving operation, a maximum value of the second target value for automated vehicle travel control. For example, the maximum value of the second target value is made larger as the accelerator opening degree becomes larger.

Figure 6:
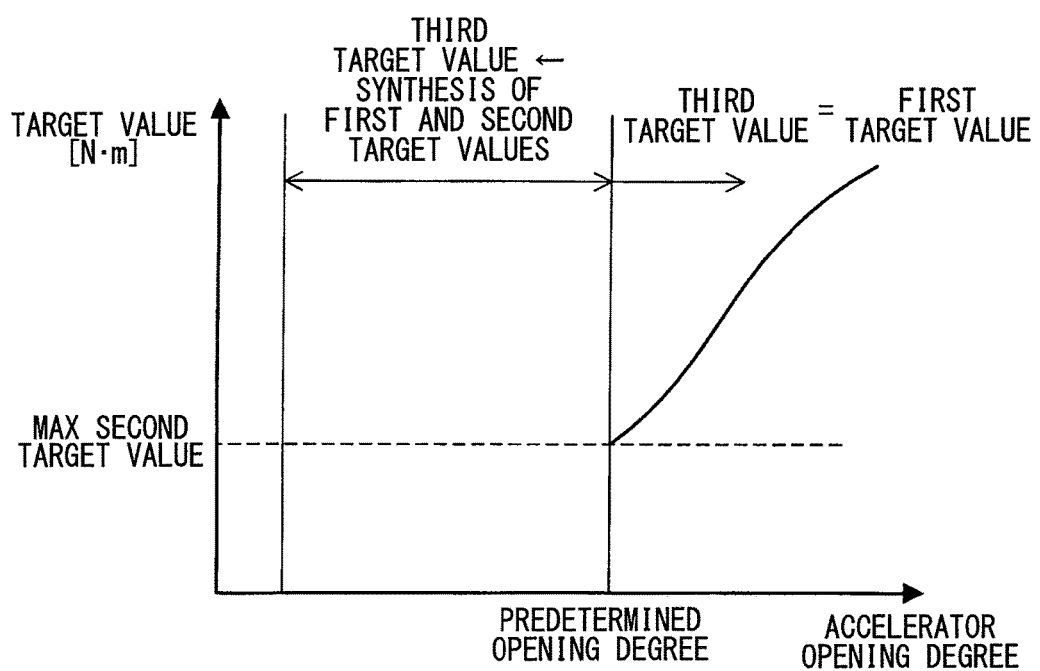
FIG. 6 is a characteristic diagram illustrating synthesis of a first target value and a second target value.

As shown in FIG. 6, when the second target value set based on: the subject-vehicle travel information obtained by the vehicle information obtaining unit 34; the preceding-vehicle travel information obtained by the preceding-vehicle information obtaining unit 36; and the information about a road portion ahead of the subject vehicle obtained by the road information obtaining unit 38 exceeds the maximum value set based on the accelerator opening degree, a second target value setting unit 64 outputs the maximum value as the second target value. When the second target value is not larger than the maximum value, the second target value setting unit 64 outputs the second target value as it is to the target value synthesis unit 50.

Like in the first embodiment, when the accelerator opening degree is smaller than a predetermined opening degree, the target value synthesis unit 50 sets the third target value by synthesizing the first target value and the second target value. When the accelerator opening degree is equal to or larger than the predetermined opening degree, the target value synthesis unit 50 sets the third target value to the first target value without using the second target value.

<2-2 Advantages>

The second embodiment described above involves the following advantages in addition to the advantages (1) to (8) of the first embodiment.

When the second target value exceeds the maximum value, the second target value setting unit 64 outputs the maximum value as the second target value. In this way, while vehicle travel control is assisted by automated control, the assistance by automated control is prevented from becoming excessive and the request concerning vehicle travel according to the amount of driver's driving operation can be appropriately reflected.

3. Third Embodiment

<3-1 Configuration>

Figure 7:
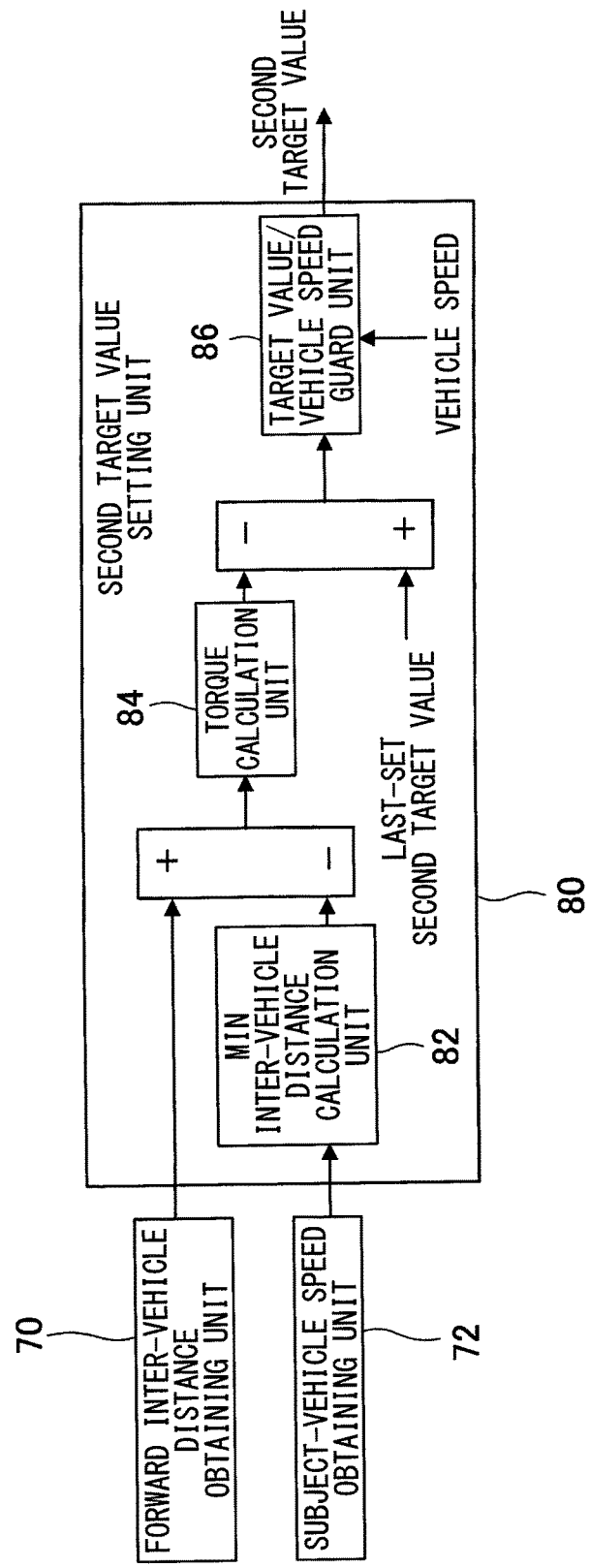
FIG. 7 is a block diagram of a second target setting unit according to a third embodiment.

A second target value setting unit 80 of a third embodiment shown in FIG. 7 sets the second target value representing a torque value effected by automated control, so as to achieve a target inter-vehicle distance set based on the traveling conditions of the subject vehicle and a preceding vehicle. In the other respects, the vehicle control device of the third embodiment is configured substantially identically to the vehicle control device 30 of the first embodiment.

A forward inter-vehicle distance obtaining unit 70 obtains, when is there is a vehicle traveling ahead of the subject vehicle, the distance between the subject vehicle and the preceding vehicle based on outputs from the radar sensor 10 or camera 12. A subject-vehicle speed obtaining unit 72 obtains the speed of the subject vehicle based on the output from the vehicle speed sensor 14.

The second target value setting unit 80 includes a minimum inter-vehicle distance calculation unit 82, a torque calculation unit 84, and a target value/vehicle speed guard unit 86.

The minimum inter-vehicle distance calculation unit 82 calculates a minimum inter-vehicle distance required to avoid a collision with the preceding vehicle based on the speed of the subject vehicle obtained from the subject-vehicle speed obtaining unit 72. To avoid a collision between the subject vehicle and the preceding vehicle, the minim inter-vehicle distance calculation unit 82 sets a longer minimum inter-vehicle distance when the subject vehicle speed is higher.

The minimum inter-vehicle distance calculation unit 82 may set a minimum inter-vehicle distance based on the subject-vehicle speed relative to the preceding vehicle. In this case, the minimum inter-vehicle distance calculation unit 82 sets a longer minimum inter-vehicle distance when the subject-vehicle speed relative to the preceding vehicle is higher to cause the subject vehicle to near the preceding vehicle faster.

The torque calculation unit 84 calculates an inter-vehicle distance difference as an inter-vehicle distance margin by subtracting the minimum inter-vehicle distance calculated by the minimum inter-vehicle distance calculation unit 82 from the actual distance between the subject vehicle and the preceding vehicle. Then, for example, the torque calculation unit 84 calculates, in a latter stage thereof, a torque value to be subtracted from the last-set second target value by multiplying the inter-vehicle distance difference by a predetermined factor K. The factor K is a negative value.

For example, when the inter-vehicle distance difference is positive, the last-set second target value may be increased to reduce the inter-vehicle distance difference, so that the torque value calculated by the torque calculation unit 84 by multiplying the inter-vehicle distance difference by factor K becomes negative. In this case, the absolute value of the negative torque value calculated by the torque calculation unit 84 is larger when the inter-vehicle distance difference is larger.

When the inter-vehicle distance difference is negative, it is necessary to reduce the last-set second target value so as to increase the inter-vehicle distance difference, so that the torque value calculated by the torque value calculation unit 84 by multiplying the inter-vehicle distance difference by factor K becomes positive. In this case, the absolute value of the positive torque value calculated by the torque calculation unit 84 is larger when the absolute value of the negative inter-vehicle distance difference is larger.

Instead of multiplying the inter-vehicle distance difference by factor K, the torque calculation unit 84 may calculate, in a latter stage thereof, a torque value to be subtracted from the last-set second target value based on the inter-vehicle distance difference and using a map or the like.

When the torque value obtained by subtracting the torque value calculated by the torque calculation unit 84 from the torque value represented by the last-set second target value equals or exceeds a torque guard value, the target value/vehicle speed guard unit 86 sets the second target value as a torque guard value.

When the current subject-vehicle speed exceeds a vehicle-speed guard value which is set due to a speed limit or the like, the target value/vehicle speed guard unit 86 sets the second target value to a negative value so as to reduce the subject-vehicle speed. In this case, the absolute value of the negative second target value is made larger when the speed difference calculated by subtracting the vehicle speed guard value from the subject-vehicle speed is larger.

<3-2 Advantages>

The third embodiment described above involves the advantages (1) to (3) of the first embodiment, and moreover, can set the second target value so as to make the distance between the subject vehicle and a preceding vehicle appropriate.

4. Fourth Embodiment

<4-1 Configuration>

Figure 8:
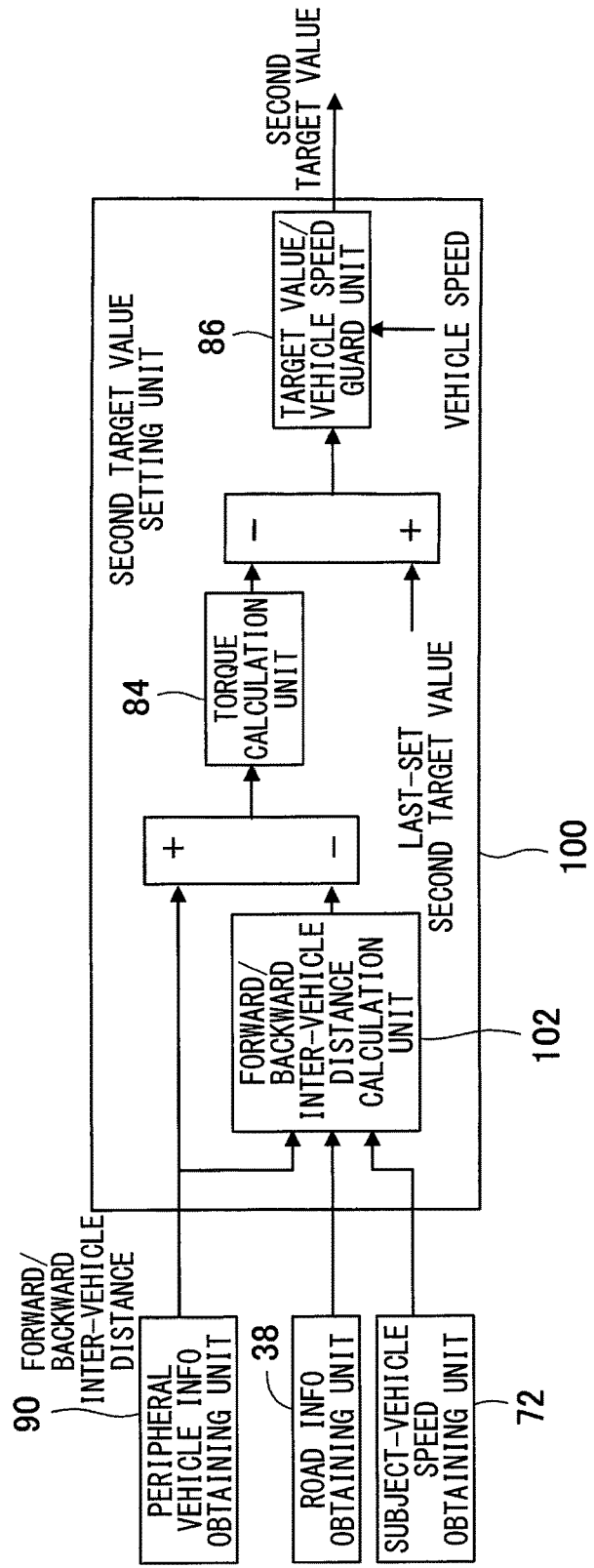
FIG. 8 is a block diagram of a second target setting unit according to a fourth embodiment.

A second target value setting unit 100 of a fourth embodiment shown in FIG. 8 sets the second target value so as to make appropriate the distances between the subject vehicle and a preceding vehicle and between the subject vehicle and a following vehicle. In the other respects, the vehicle control device of the fourth embodiment is configured substantially identically to the vehicle control device 30 of the first embodiment.

A peripheral vehicle information obtaining unit 90 of a fourth embodiment shown in FIG. 8 obtains, based on the output from the radar sensor 10 or camera 12, an actual forward inter-vehicle distance which is an actual distance between the subject vehicle and a preceding vehicle and an actual backward inter-vehicle distance which is an actual distance between the subject vehicle and a following vehicle.

The second target value setting unit 100 includes a forward/backward inter-vehicle distance calculation unit 102 and a target value/vehicle speed guard unit 86 configured substantially identically to the target value/vehicle speed guard unit 86 of the third embodiment.

The forward/backward inter-vehicle distance calculation unit 102 calculates optimum inter-vehicle distances between the subject vehicle and a preceding vehicle and between the subject vehicle and a following vehicle based on the actual forward and backward inter-vehicle distances obtained by the peripheral vehicle information obtaining unit 90, the gradient of a road portion ahead of the subject vehicle obtained by the road information obtaining unit 38, and the subject-vehicle speed obtained by the subject-vehicle speed obtaining unit 72.

The forward/backward inter-vehicle distance calculation unit 102 calculates a minimum forward inter-vehicle distance between the subject vehicle and a preceding vehicle and a minimum backward inter-vehicle distance between the subject vehicle and a following vehicle based on the subject-vehicle speed obtained by the subject-vehicle speed obtaining unit 72.

To avoid a collision between the subject vehicle and a preceding vehicle, the forward/backward inter-vehicle distance calculation unit 102 sets the minimum forward inter-vehicle distance to be longer when the subject-vehicle speed is higher. To avoid a collision between the subject vehicle and a following vehicle, the forward/backward inter-vehicle distance calculation unit 102 sets the minimum backward inter-vehicle distance to be longer when the subject-vehicle speed is lower.

When the road ahead of the subject vehicle is an uphill road according to the road information obtained by the road information obtaining unit 38, the forward/backward inter-vehicle distance calculation unit 102 reduces the minimum forward inter-vehicle distance and the minimum backward inter-vehicle distance. When the road ahead of the subject vehicle is a downhill road, the forward/backward inter-vehicle distance calculation unit 102 increases the minimum forward inter-vehicle distance and the minimum backward inter-vehicle distance.

The forward/backward inter-vehicle distance calculation unit 102 calculates the difference between the actual forward inter-vehicle distance and the minimum forward inter-vehicle distance as a forward inter-vehicle distance difference and calculates the difference between the actual backward inter-vehicle distance and the minimum backward inter-vehicle distance as a backward inter-vehicle distance difference.

Subsequently, the forward/backward inter-vehicle distance calculation unit 102 calculates an average value of the forward inter-vehicle distance difference and the backward inter-vehicle distance difference, that is, averages the inter-vehicle distance margins between the subject vehicle and the preceding vehicle and between the subject vehicle and the following vehicle. The forward/backward inter-vehicle distance calculation unit 102 then calculates an optimum forward inter-vehicle distance and an optimum backward inter-vehicle distance by adding the calculated average value of the forward inter-vehicle distance difference and the backward inter-vehicle distance difference to the minimum forward inter-vehicle distance and the minimum backward inter-vehicle distance, respectively.

When the actual forward inter-vehicle distance equals the optimum forward inter-vehicle distance or when the actual backward inter-vehicle distance equals the optimum backward inter-vehicle distance, the distance between the subject vehicle and the preceding vehicle or the distance between the subject vehicle and the following vehicle becomes optimum one.

Hence, the torque calculation unit 84 calculates, in a latter stage thereof, a torque value to be subtracted from the last-set second target value based on the forward inter-vehicle distance difference, i.e. the difference between the actual forward inter-vehicle distance and the optimum forward inter-vehicle distance, and the backward inter-vehicle distance difference, i.e. the difference between the actual backward inter-vehicle distance and the optimum backward inter-vehicle distance, and using a map or the like.

For example, when the forward inter-vehicle distance difference is positive, the last-set second target value may be increased to reduce the forward inter-vehicle distance difference, so that the torque value calculated by the torque calculation unit 84 becomes negative. In this case, the absolute value of the negative torque value calculated by the torque calculation unit 84 is larger when the forward inter-vehicle distance difference is larger.

When the forward inter-vehicle distance difference is negative, it is necessary to reduce the last-set second target value to increase the forward inter-vehicle distance difference, so that the torque value calculated by the torque calculation unit 84 becomes positive. In this case, the absolute value of the positive torque value calculated by the torque calculation unit 84 is larger when the absolute value of the negative forward inter-vehicle distance difference is larger.

Like in the third embodiment, when the torque value obtained by subtracting the torque value calculated by the torque calculation unit 84 from the torque value represented by the last-set second target value equals or exceeds a torque guard value, the target value/vehicle speed guard unit 86 sets the second target value as a torque guard value. Also, when the current subject-vehicle speed exceeds a vehicle-speed guard value set which is due to a speed limit or the like, the target value/vehicle speed guard unit 86 sets the second target value to a negative value.

<4-2 Advantages>

The fourth embodiment described above involves the advantages (1) to (3) of the first embodiment, and moreover, can set the second target value so as to make appropriate the distances between the subject vehicle and a preceding vehicle and between the subject vehicle and a following vehicle.

5. Fifth Embodiment

<5-1 Configuration>

Figure 9:
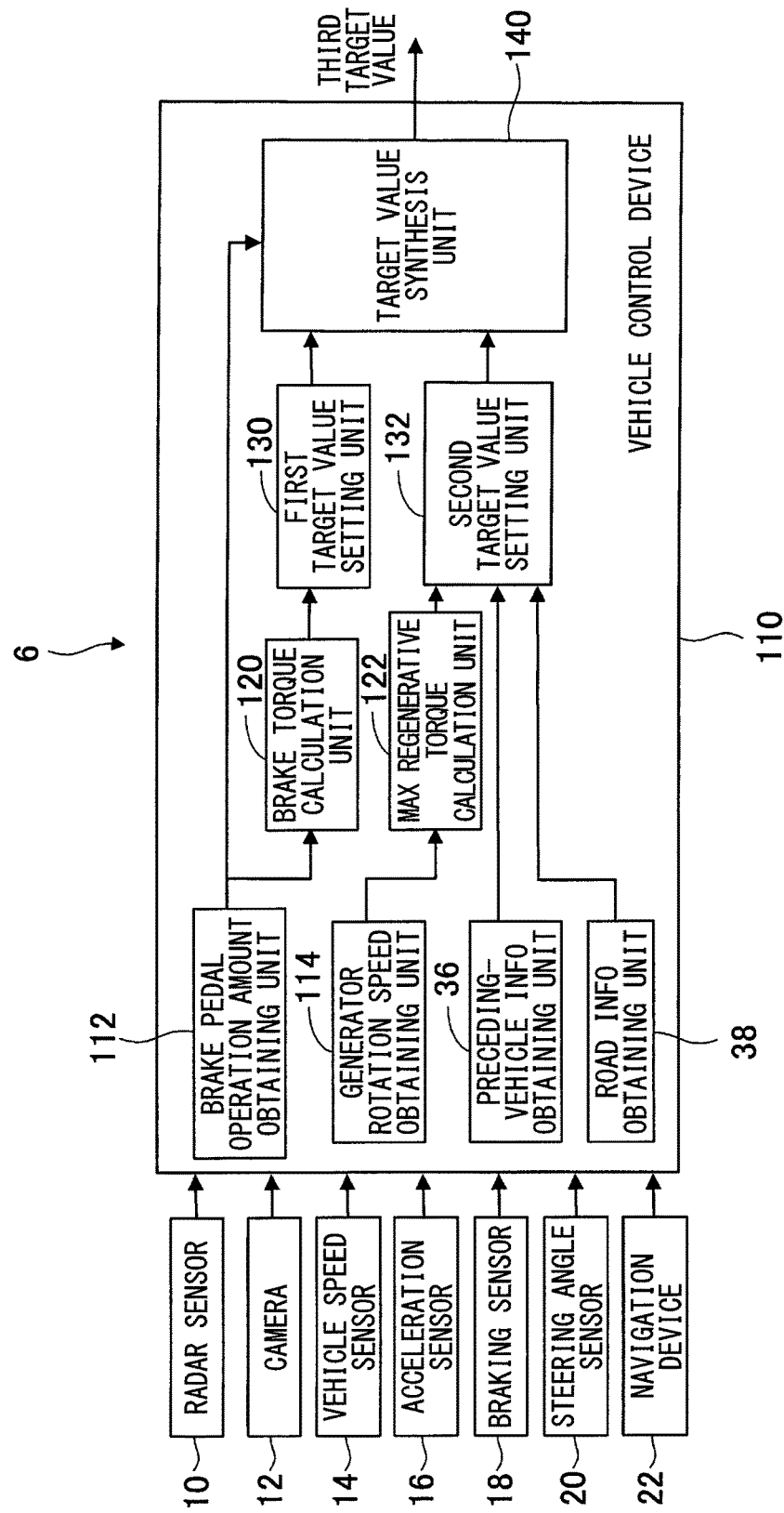
FIG. 9 is a block diagram of a vehicle control system according to a fifth embodiment.

In a vehicle control system 6 of a fifth embodiment shown in FIG. 9, a vehicle control device 110 sets a brake torque value as a first target value based on the amount of brake pedal depression as the amount of driver's driving operation. The vehicle control device 110 also sets, as a second target value, a value of regenerative torque generated by a generator driven by the rotation of the engine. The vehicle control device 110 then sets, by synthesizing the first target value and the second target value, a third target value to act as braking force against the output torque of the engine. The fifth embodiment differs from the first embodiment in the above respect.

The vehicle control device 110 includes a preceding-vehicle information obtaining unit 36, a road information obtaining unit 38, a brake pedal operation amount obtaining unit 112, a generator rotation speed obtaining unit 114, a brake torque calculation unit 120, a maximum regenerative torque calculation unit 122, a first target value setting unit 130, a second target value setting unit 132, and a target value synthesis unit 140.

The brake pedal operation amount obtaining unit 112 obtains the amount of brake pedal depression from the braking sensor 18. The generator rotation speed obtaining unit 114 obtains the rotation speed of an in-vehicle generator from a rotation speed sensor attached to the generator or based on the engine rotation speed.

The brake torque calculation unit 120 calculates a brake torque value based on the amount of brake pedal depression obtained by the brake pedal operation amount obtaining unit 112. The maximum regenerative torque calculation unit 122 calculates, based on the engine rotation speed obtained by the generator rotation speed obtaining unit 114, a maximum value of the regenerative torque generated when the generator generates power.

The first target value setting unit 130 sets the brake torque value calculated by the brake torque calculation unit 120 as the first target value. The second target value setting unit 132 sets a regenerative torque value as a second target value for automated control based on, for example, the maximum value of the regenerative torque generated by the generator calculated by the maximum regenerative torque calculation unit 122, the inter-vehicle distance between a preceding vehicle and the subject vehicle obtained by the preceding-vehicle information obtaining unit 36, and the gradient and curving degree of a road portion or the like ahead of the subject vehicle obtained by the road information obtaining unit 38.

The target value synthesis unit 140 sets, as the third target value, a target value of braking force to act against the output torque of the engine of the subject vehicle by synthesizing the first target value set by the first target value setting unit 130 and the second target value set by the second target value setting unit 132.

The target value synthesis unit 140 sets, when the amount of brake pedal depression obtained by the brake pedal operation amount obtaining unit 112 is smaller than a predetermined threshold, the third target value by synthesizing the first target value and the second target value.

The target value synthesis unit 140 determines, when the amount of brake pedal depression is equal to or larger than the predetermined threshold, that the driver deeply depressed the brake pedal, for example, to avoid a collision with a forward object and sets the third target value to the first target value without using the second target value.

<5-2 Advantages>

The fifth embodiment described above involves the following advantages.

(1) When the amount of brake pedal depression is smaller than a predetermined threshold, the target value synthesis unit 140 sets the third target value by synthesizing the first target value and the second target value. When, on the other hand, the amount of brake pedal depression is equal to or larger than the predetermined threshold, the target value synthesis unit 140 sets the third target value to the first target value without using the second target value.

This makes it unnecessary for the vehicle driver to operate a switch or the like to switch over between vehicle control made by driver's brake operation and automated vehicle control.

(2) When the amount of brake pedal depression is smaller than a predetermined threshold, the target value synthesis unit 140 sets the third target value by synthesizing the first target value and the second target value, so that an appropriate third target value to be applied to vehicle travel control can be set while using automated travel assistance and reflecting the amount of driver's brake pedal depression.

For example, an appropriate value of braking force can be set by maximizing the use of the braking force by the regenerative torque and minimizing the use of braking force by a mechanical hydraulic brake dependent on the amount of brake pedal operation.

(3) When the amount of brake pedal depression is equal to or larger than a predetermined threshold, the target value synthesis unit 140 sets the third target value to the first target value without using the second target value. Therefore, when the driver becomes greatly desirous of controlling the vehicle travel, the vehicle travel can be controlled according to the driver's will.

6. Sixth Embodiment

<6-1 Configuration>

Figure 10:
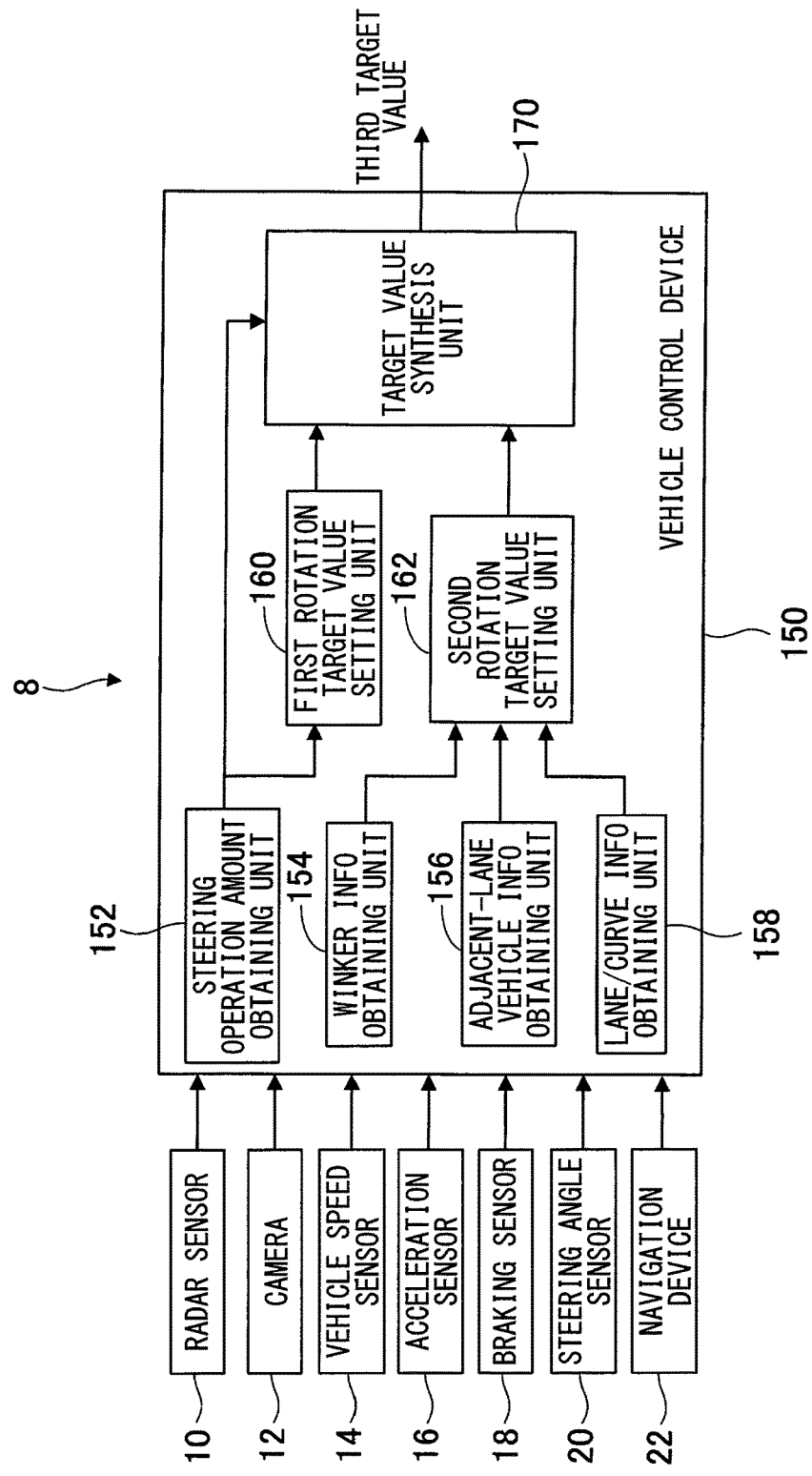
FIG. 10 is a block diagram of a vehicle control system according to a sixth embodiment.

A sixth embodiment differs from the first embodiment in that, in a vehicle control system 8 shown in FIG. 10, a vehicle control device 150 sets amounts of vehicle wheel steering as a first, a second, and a third target value.

The vehicle control device 150 includes a steering operation amount obtaining unit 152, a winker information obtaining unit 154, an adjacent-lane vehicle information obtaining unit 156, a lane/curve information obtaining unit 158, a first target value setting unit 160, a second target value setting unit 162, and a target value synthesis unit 170.

The steering operation amount obtaining unit 152 obtains the steering angle and steering speed from the steering angle sensor 20. The winker information obtaining unit 154 obtains the direction, left or right, indicated by winkers.

The adjacent-lane vehicle information obtaining unit 156 obtains information about a vehicle traveling on an adjacent lane as adjacent-lane vehicle information such as whether there is a vehicle traveling on an adjacent lane, the distance between the subject vehicle and the adjacent-lane vehicle, and the speed of the adjacent-lane vehicle and the like from the sensor 10 and the camera 12. The lane/curve information obtaining unit 158 obtains information about the lane on which the subject vehicle is traveling and road curve information from the navigation device 22.

The first target value setting unit 160 sets an amount and a speed of vehicle wheel steering as first target values based on the steering angle and steering speed obtained by the steering operation amount obtaining unit 152.

The second target value setting unit 162 sets the amount of vehicle wheel steering and the vehicle wheel steering speed as second target values based on the direction indicated by winkers, information about a vehicle traveling on an adjacent lane, and information about the road on which the subject vehicle is traveling.

For example, when the direction indicated by winkers is right and there is a vehicle traveling rearward of the subject vehicle on a right-side lane with respect to the subject vehicle with an adequate distance from the subject vehicle, the second target value setting unit 162 sets the vehicle wheel steering speed to be faster than when there is no vehicle traveling on the right-side lane.

In this way, even in cases where the speed of steering when the driver intends to change to the right-side lane is the same as when there is no vehicle traveling on the right-side lane, the third target values generated by and outputted by the target value synthesis unit 170 by synthesizing the first target values and the second target values are higher than the steering speed indicated by the first target values that are set by driver's steering wheel operation.

This makes it possible to move the subject vehicle to the right-side lane before another vehicle traveling on the right-side lane comes too close to the subject vehicle.

When the road on which the subject vehicle is traveling is curved rightward, the second target value setting unit 162 sets the second target value representing a target amount of vehicle wheel steering to be larger when the direction indicated by winkers is right than when the indicated direction is left.

Similarly, when the road on which the subject vehicle is traveling is curved leftward, the second target value setting unit 162 sets the second target value representing a target amount of vehicle wheel steering to be larger when the direction indicated by winkers is left than when the indicated direction is right.

In this way, the second target value setting unit 162 can set the second target values according to the degree of road curving and the lane change direction.

When the angle or speed of steering by the driver obtained by the steering operation amount obtaining unit 152 is smaller than a corresponding predetermined threshold, the target value synthesis unit 170 sets an amount and a speed of vehicle wheel steering as the third target values by synthesizing the first target values and the second target values.

When the angle or speed of steering by the driver obtained by the steering operation amount obtaining unit 152 is equal to or larger than the corresponding predetermined threshold, the target value synthesis unit 170 determines that the driver has made steering largely or quickly, for example, to avoid colliding with a forward object and sets the third target values to the first target values without using the second target values.

<6-2 Advantages>

The sixth embodiment described above involves the following advantages.

(1) When the angle or speed of steering operation is smaller than a corresponding predetermined threshold, the target value synthesis unit 170 sets the third target values by synthesizing the first target values and the second target values. On the other hand, when the angle or speed of steering operation is equal to or larger than the corresponding predetermined threshold, the target value synthesis unit 170 sets the third target values to the first target values without using the second target values.

This makes it unnecessary for the vehicle driver to operate a switch or the like to switch over between vehicle control made by driver's steering operation and automated vehicle control.

(2) When the angle or speed of steering operation is smaller than the corresponding predetermined threshold, the target value synthesis unit 170 sets the third target values by synthesizing the first target values and the second target values, so that appropriate third target values to be applied to vehicle travel control can be set while using automated travel assistance and reflecting the amount of driver's steering operation.

(3) When the angle or speed of steering operation is equal to or larger than the corresponding predetermined threshold, the target value synthesis unit 170 sets the third target values to the first target values without using the second target values. Therefore, when the driver becomes greatly desirous of controlling the vehicle travel, the vehicle travel can be controlled according to the driver's will.

7. Other Embodiments

Embodiments have been described above, but the above embodiments do not limit the present disclosure and can be appropriately modified, for example, as follows.

(1) In the above embodiments, when an amount of driver's driving operation, for example, the accelerator opening degree, the amount of brake pedal depression, or the amount of steering operation equals or exceeds a corresponding predetermined threshold, the third target value is set to the first target value without using the second target value. Alternatively, when the first target value, which is set based on the amount of driving operation, equals or exceeds a predetermined threshold, the third target value may be set to the first target value without using the second target value.

(2) In the second embodiment, when the second target value exceeds a maximum value which is set based on the accelerator opening degree, the second target setting unit 64 may output 0 as the second target value. This makes it possible, when, for vehicle travel, the assistance by automated control becomes too much, to eliminate the assistance by automated control and control vehicle travel based on the amount of driver's driving operation.

(3) In the second embodiment, without providing the maximum value setting unit 62, a maximum value of the second target value may be set by the target value synthesis unit 50. Whether or not the second target value is larger than the maximum value may be determined by the target value synthesis unit 50.

(4) Functions of a single constituent element in the above embodiments may be distributed to a plurality of constituent elements, or functions of a plurality of constituent elements may be integrated into a single constituent element. At least a part of the configuration of each of the above embodiments may be replaced by a different configuration having a similar function. The configuration of each of the above embodiments may be partly omitted. Also, at least a part of the configuration of any of the above embodiments may be added to by or may replace the configuration of any other one of the above embodiments.

(5) Besides the vehicle control device described above, various other forms of embodiments are possible, for example, a vehicle control system including the vehicle control device as a constituent element, a program to cause a computer to function as the vehicle control device, a storage medium storing a program, and a vehicle control method.

In the above and other embodiments, the operation amount obtaining unit corresponds to the operation amount obtaining means. The first target value setting units 40, 130, 160 correspond to the first setting unit and the first setting means. The second target value setting units 42, 64, 80, 100, 132, 162 correspond to the second setting unit and the second setting means. The target value synthesis units 50, 140, 170 correspond to the third setting unit and the third setting means. The maximum value setting unit 62 corresponds to the maximum value setting means. The brake pedal operation amount obtaining unit 112 corresponds to the operation amount obtaining unit and the operation amount obtaining means. The steering operation amount obtaining unit 152 corresponds to the operation amount obtaining unit and the operation amount obtaining means.

The invention claimed is:

1. A vehicle control device, comprising:
    an operation amount obtaining unit that obtains a driver's driving operation amount;
    a first setting unit that, based on the driving operation amount obtained by the operation amount obtaining unit, sets a first target value for vehicle travel control;
    a second setting unit that, by automated control performed or executed by the vehicle control device, sets a second target value for controlling the vehicle travel; and
    a third setting unit that synthesizes the first target value and the second target value based on the driving operation amount or the first target value, and sets a third target value for actually controlling the vehicle travel, wherein
    the second setting unit sets the second target value so as to achieve maximum fuel efficiency for the vehicle.

2. The vehicle control device according to claim 1, wherein
    the third setting unit determines whether
        to set the third target value by synthesizing the first target value and the second target value based on the driving operation amount or the first target value, or
        to set the third target value to the first target value without using the second target value.

3. The vehicle control device according to claim 2, wherein
    when the driving operation amount or the first target value is smaller than a corresponding predetermined threshold, the third setting unit sets the third target value by synthesizing the first target value and the second target value, and
    when the driving operation amount or the first target value is not smaller than the corresponding predetermined threshold, the third setting unit sets the third target value to the first target value without using the second target value.

4. The vehicle control device according to claim 2, further comprising
    a maximum value setting unit that sets, based on the driving operation amount or the first target value, a maximum value of the second target value to be set by the second setting unit.

5. The vehicle control device according to claim 4, wherein
    when the second target value exceeds the maximum value set by the maximum value setting unit, the third setting unit sets the third target value to the first target value without using the second target value.

6. The vehicle control device according to claim 2, wherein
    when switching is made between a mode in which the third target value is set by synthesizing the first target value and the second target value and a mode in which the third target value is set to the first target value without using the second target value, the third setting unit keeps the third target value unchanged.

7. The vehicle control device according to claim 1, wherein
    the third setting unit makes a direction of increase/decrease of the third target value coincide with a direction of increase/decrease of the first target value.

8. The vehicle control device according to claim 1, wherein
    the third setting unit sets the third target value to a value between the first target value and the second target value.

9. The vehicle control device according to claim 1, wherein
    when the first target value and the second target value are equal, the third setting unit sets the third target value to a value equaling the first target value and the second target value.

10. The vehicle control device according to claim 1, wherein
    the third setting unit sets the third target value such that a direction of increase/decrease of a difference between the second target value and the third target value coincides with a direction of increase/decrease of a difference between the second target value and the first target value.

11. A vehicle control device, comprising:
    an operation amount obtaining unit that obtains a driver's driving operation amount;
    a first setting unit that, based on the driving operation amount obtained by the operation amount obtaining unit, sets a first target value for vehicle travel control;
    a second setting unit that, by automated control performed or executed by the vehicle control device, sets a second target value for controlling the vehicle travel; and
    a third setting unit that synthesizes the first target value and the second target value based on the driving operation amount or the first target value, and sets a third target value for actually controlling the vehicle travel, wherein
    the second setting unit sets the second target value so as to achieve a target inter-vehicle distance that is set based on traveling conditions of a subject vehicle and a preceding vehicle traveling ahead of the subject vehicle.

12. A vehicle control device, comprising:
    an operation amount obtaining unit that obtains a driver's driving operation amount;

a first setting unit that, based on the driving operation amount obtained by the operation amount obtaining unit, sets a first target value for vehicle travel control;

a second setting unit that, by automated control performed or executed by the vehicle control device, sets a second target value for controlling the vehicle travel; and a third setting unit that synthesizes the first target value and the second target value based on the driving operation amount or the first target value, and sets a third target value for actually controlling the vehicle travel, wherein the operation amount obtaining unit obtains an amount of driver's accelerator pedal operation as the driving operation amount.

13. A vehicle control device, comprising:

an operation amount obtaining unit that obtains a driver's driving operation amount;

a first setting unit that, based on the driving operation amount obtained by the operation amount obtaining unit, sets a first target value for vehicle travel control;

a second setting unit that, by automated control performed or executed by the vehicle control device, sets a second target value for controlling the vehicle travel; and a third setting unit that synthesizes the first target value and the second target value based on the driving operation amount or the first target value, and sets a third target value for actually controlling the vehicle travel, wherein the operation amount obtaining unit obtains an amount of driver's brake pedal operation as the driving operation amount.

14. The vehicle control device according to claim 1, wherein the operation amount obtaining unit obtains an amount of driver's steering operation as the driving operation amount.

15. The vehicle control device according to claim 11, wherein the second setting unit sets the second target value so as to achieve maximum fuel efficiency for the vehicle.

* * * * *